United States Patent [19]

Ohkubo

[11] Patent Number: 4,553,623
[45] Date of Patent: Nov. 19, 1985

[54] POWER CHANGE-OVER MECHANISM OF A VEHICLE FOR INDUSTRIAL MACHINERY

[75] Inventor: Masahiro Ohkubo, Kadoma, Japan

[73] Assignee: Kabushiki Kaisha Daikin Seisakusho, Neyagawa, Japan

[21] Appl. No.: 621,318

[22] Filed: Jun. 15, 1984

[30] Foreign Application Priority Data

Jun. 15, 1983 [JP] Japan .................. 58-108286

[51] Int. Cl.$^4$ .................. B60K 17/34; B60K 41/22
[52] U.S. Cl. .................. 180/247; 74/700; 192/48.91; 192/30 V
[58] Field of Search .................. 180/247, 233; 74/700; 192/48.91, 30 V

[56] References Cited

U.S. PATENT DOCUMENTS 4,098,381 7/1978 Mueller et al. .................. 192/48.91
4,452,094 6/1984 Schetter .................. 192/48.91

FOREIGN PATENT DOCUMENTS 706601 5/1941 Fed. Rep. of Germany ... 192/48.91
29820 2/1982 Japan .................. 192/48.91

Primary Examiner—Albert W. Davis, Jr.
Attorney, Agent, or Firm—Armstrong, Nikaido, Marmelstein & Kubovcik

[57] ABSTRACT

A power change-over mechanism of a vehicle for industrial machinery, in which a power change-over spool is divided into an outer peripheral side member and an inner peripheral side member, splines freely meshing with splines of a high-speed gear and a low-speed gear are formed on the outer peripheral side member, a spline freely meshing with splines of a first driving shaft and a second driving shaft is formed on the inner peripheral side member, and the both members are connected each other so as to integrally rotate in the rotational direction and to relatively slide through a damper means in the axial direction.

8 Claims, 4 Drawing Figures

POWER CHANGE-OVER MECHANISM OF A VEHICLE FOR INDUSTRIAL MACHINERY

BACKGROUND OF THE INVENTION

This invention relates to a power change-over mechanism of a vehicle for industrial machinery, which permits free change-over between four-wheel drive and two-wheel drive.

First, a conventional power change-over mechanism will be described hereunder referring to FIG. 1. A first driving shaft 1 for driving a front wheel and a second driving shaft 2 for driving a rear wheel are both aligned on the same axis center, and at the same time they have outward splines 3, 4 respectively. A high-speed gear 5 and a low-speed gear 6 fit onto the first and second driving shafts 1, 2 through bearings 7, 7a, and at the same time they have inward splines 8, 9 respectively. An annular power change-over spool 10 has a pair of inward splines 11, 12 and a pair of outward splines 13, 14 and at the same time it provides an annular groove 16 for engagement with a shift fork and spline fits onto the first driving shaft 1 freely slidingly operably in the axial direction.

In case of the four-wheel drive, the spool 10 is shifted rearward to interconnect the low-speed gear 6 through the spool 10 to the first and second shafts 1, 2. Namely, a power transmitted from an engine through a transmission to the low-speed gear 6 is transmitted through the splines 9, 14 to the spool 10, and further transmitted from the spool 10 to the first driving shaft 1 through means of the splines 11, 3 and to the second driving sfaft 2 through means of the splines 12, 4.

In case of the two-wheel drive, the spool 10 is shifted forward to interconnect the high-speed gear 5 through the spool 10 to the first driving shaft 1. Namely, the power transmitted from the engine through the transmission to the high-speed gear 5 is transmitted through the splines 8, 13 to the spool 10, and further transmitted from the spool 10 to the first driving shaft 1 through means of the splines 11, 3 to drive the front wheel.

However, in case when the power change-over mechanism is composed of the power change-over annular spool 10 as a member, the following disadvantages will arise at the time of change-over. Generally, in case of power change-over, a power from an engine has previously been cut off by means of a clutch etc. and the change-over operation is done with a vehicle stopped. However, in case of change-over from the two-wheel drive to the four-wheel drive, meshing of gears is under fixed condition because of the driving shaft 1 being interconnected to the front wheel and the driving shaft 2 being interconnected to the rear wheel, so that the spline 12 of the spool 10 would not mesh with spline 4 of the driving shaft 2 to make the change-over from the two-wheel drive into the four-wheel drive impossible.

Further, under a normal four-wheel drive operation, a torsion will be produced between the driving shafts 1, 2 due to slippage of wheel and large contact forces will be generated between the spline 3 of the driving shaft 1 and the spline 11 of the spool 10 and between the spline 4 of the driving shaft 2 and the spline 12 of the spool 10, so that the spool 10 would not slide to make the change-over from the four-wheel drive into the two-wheel drive impossible. For this reason, a change-over from a high-speed into a low-speed or a change-over from a low-speed into a high-speed will naturally become impossible.

An object of this invention is to dissolve the above disadvantages, i.e. to enable change-overs between the four-wheel drive and the two-wheel drive and between a high-speed and a low-speed by only operating a set of spools once even when a vehicle is stopping with the splines of the driving shafts for the front and rear wheels being not meshed each other due to deviation of phases thereof, or with a torsion being produced between the driving shafts of the front and rear wheels.

In order to accomplish the above object in this invention; in a power change-over mechanism of a vehicle for industrial machinery in which a first driving shaft and a second driving shaft are aligned on the same axis center, a high speed gear and a low-speed gear are fitted onto the first and second driving shafts, splines are formed on said both gears and both shafts, a power change-over annular spool is disposed between the both gears freely slidingly operably in the axial direction, splines are formed on said spool, the low-speed gear is interconnected through the spool to the first and second driving shafts when the spool is in a four-wheel drive position and the high-speed gear is interconnected through the spool to the first driving shaft when the spool is in a two-wheel drive position; the spool is divided into two members: an outer peripheral side member having splines meshing freely with the splines of said gears and an inner peripheral side member having a spline meshing freely with the splines of said driving shafts, said both members being connected each other so as to integrally rotate in the rotational direction and to relatively slide through a damper means in the axial direction.

DETAILED DESCRIPTION OF THE INVENTION

Figure 1:
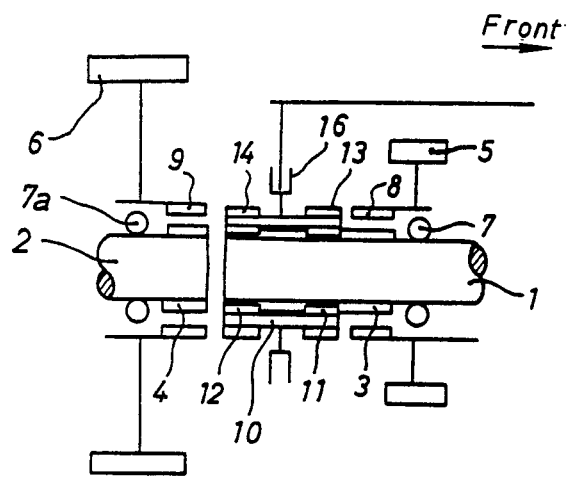
FIG. 1 is a vertical sectional shematic diagram according to a conventional embodiment.
Figure 2:
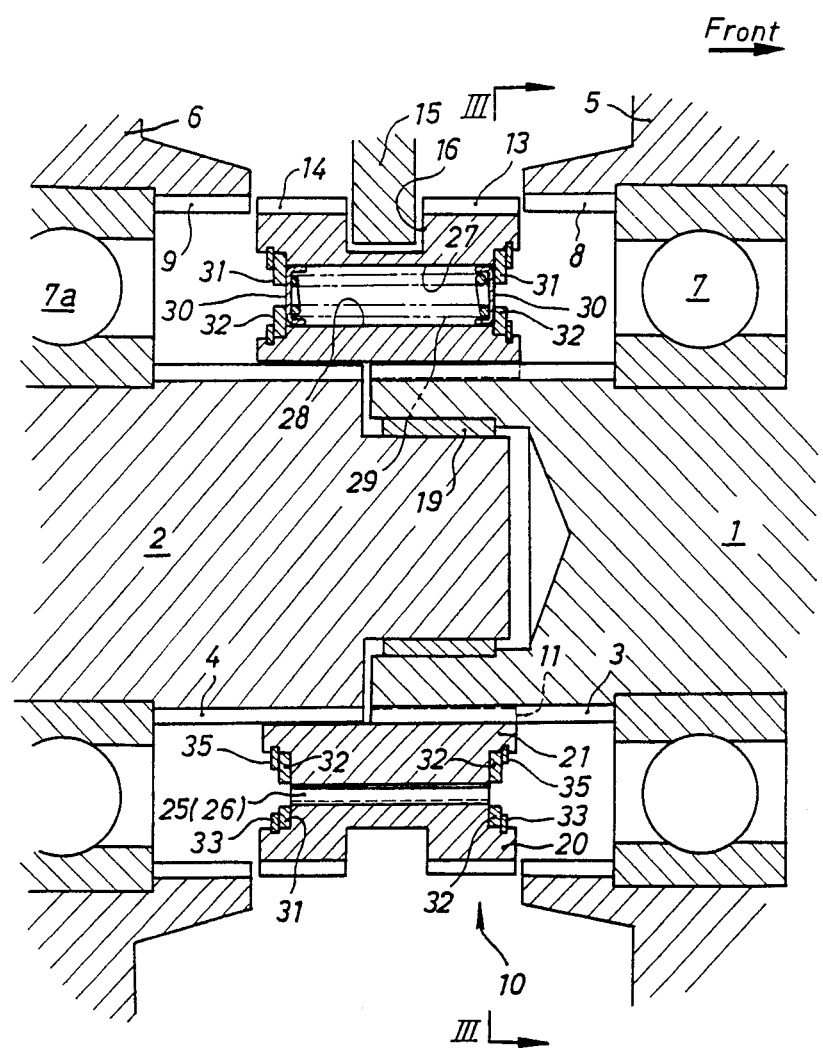
FIG. 2 is a vertical sectional view according to a first embodiment of this invention.

FIG. 2 shows a first embodiment, in which a component corresponding to that of said FIG. 1 is attached with the same number as FIG. 1. In this FIG. 2, first and second driving shafts 1, 2 are aligned on the same axis center through an aligning bearing metal 19, the first driving shaft 1 is interconnected, for example, to a front wheel at a front side and the second driving shaft 2 is interconnected to a rear wheel at a rear side. A high-speed gear 5 fits freely rotatably onto the first driving shaft 1 through a bearing 7, a low-speed gear 6 fits freely rotatably onto the second driving shaft 2 through a bearing 7a, the both gears 5, 6 mesh with appropriate gears of a transmission (not shown) respectively, thus a power being transmitted from an engine through a clutch etc. Naturally, the high-speed gear 5 rotates at a higher speed than that of the low-speed gear 6.

Outward splines 3, 4 are formed on the first and second driving shafts 1, 2 respectively, and inward splines 8, 9 are formed on bosses of the both gears 5, 6 respectively. The spline 8 of the high-speed gear 5 faces at the spline 3 of the first driving shaft 1 with a space left therebetween and the spline 9 of the low-speed gear 6 faces at the spline 4 of the second driving shaft 2 with a space left therebetween.

Figure 3:
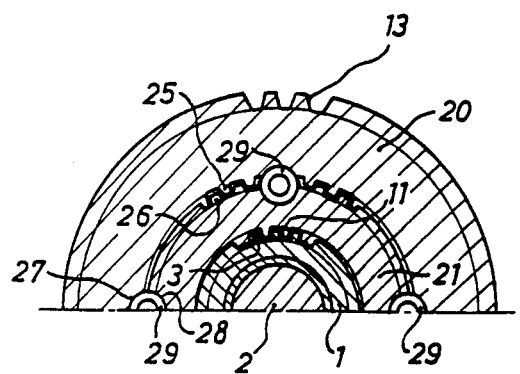
FIG. 3 is a sectional view taken on the line III—III of FIG. 2.

A power change-over annular spool 10 disposed between the both gears 5, 6 is divided into an outer peripheral side member 20 and an inner peripheral side member 21, the both members 20, 21 fit each other through splines 25, 26 shown in FIG. 3, thus the both members 20, 21 always being able to integrally rotate in the rotational direction and to relatively slide each other in the axial direction.

Plural spring receiving notchs 27 are formed on an inner peripheral surface of the outer peripheral side member 20, spring receiving notchs 28 corresponding to said notchs 27 are formed on an outer peripheral surface of the inner peripheral side member 21, and a coil spring 29 functioning as a damper means is compressively provided between a cylindrical space formed by the both notchs 27, 28 freely expansively and contractibly in the axial direction. Both axial ends of the spring 29 are stopped by means of a pair of large and small annular holding plates 31, 32 through spring seats 30 (FIG. 2). The both plates 31, 32 are formed into an annular shape with its center on the axis center of the first and second driving shafts 1, 2, the large dia. plate 31 is held by a snap ring 33 on the inner peripheral surface of the outer peripheral side member 20 in the axial direction, and the small dia. plate 32 is held by a snap ring 35 on the outer peripheral surface of the inner peripheral side member 21 in the axial direction.

The both members 20, 21 are arranged at the same axial position by means of an elastic force of the spring 29, however, the outer peripheral side member 20 can be moved relatively to the inner peripheral side member 21 in the axial direction.

Splines 13, 14 freely meshing with the splines 8, 9 of the gears 5, 6 are formed on an outer peripheral surface of the outer peripheral side member 20. A spline 11 normally meshing with the spline 3 of the first driving shaft 1 is formed on an inner peripheral surface of the inner peripheral side member 21, and this spline 11 freely meshes with the spline 4 of the second driving shaft 2. Further, a shift fork 15 engaging annular groove 16 is formed on the outer peripheral surface of the outer peripheral side member 20, and the spool 10 is operably shifted in the axial direction (forward and rearward direction) through a shift fork 15 engaging with this groove 16.

When the spool 10 is shifted forward, the front side spline 13 of the outer peripheral side member 20 meshes with the spline 8 of the high-speed gear 5 to enable a power to be transmitted from the high-speed gear 5 only to the first driving shaft 1. Namely, the vehicle becomes able to run on the high-speed two-wheel drive.

When the spool 10 is shifted rearward, the rear side spline 14 of the outer peripheral side member 20 meshes with the spline 9 of the low-speed gear 6, and at the same time the spline 11 of the inner peripheral side member 21 meshes with the spline 4 of the second driving shaft 2 to enable the power to be transmitted from the low-speed gear 6 to both the shafts 1, 2. Namely, the vehicle becomes able to run on the low-speed four-wheel drive.

Incidentally, power transmission paths under the high-speed two-wheel drive and the low-speed four-wheel drive will be briefly described hereunder. At the time of high-speed two-wheel drive, the power is transmitted from the high-speed gear 5 through the splines 8, 13, the outer peripheral side member 20, splines 25, 26, the inner peripheral side member 21 and the splines 11, 3 to the first driving shaft 1. At the time of low-speed four-wheel drive, the power is transmitted from the low-speed gear 6 through the splines 9, 14, the outer peripheral side member 20, splines 25, 26, the inner peripheral side member 21, the splines 11, 3, and the splines 11, 4 to the first and second driving shafts 1, 2.

While the vehicle is stopped under the two-wheel drive mode, when a phase difference is produced between the spline 11 of the spool 10 and the spline 4 of the driving shaft 2, the change-over from the two-wheel drive into the four-wheel drive is performed as follows. When the spool 10 is shifted to the rearward of FIG. 2, the spline 14 of the spool outer peripheral side member 20 meshes with the spline 9 of the low-speed gear 6, and the spline 11 of the inner peripheral side member 21 only contacts but not meshes with a front edge of the spline 4 of the driving shaft 2. However, at the moment when phases of both the splines 4, 11 coincide after the vehicle starts to move, the spline 11 of the inner peripheral side member 21 meshes with the spline 4 of the driving shaft 2 due to an elastic force of the spring 29 to automatically change the drive mode into the four-wheel drive.

While the vehicle is stopped under the four-wheel drive mode, when a torsion is produced between the driving shafts 1, 2 due to slippage of the wheel etc. to increase a contact pressure between the spline 3 of the driving shaft 1 and the spline 11 of the spool 10 and that between the spline 4 of the driving shaft 2 and the spline 11 of the spool 10, the change-over from the four-wheel drive to the two-wheel drive is performed as follows. When the drive position is to be changed from the low-speed four-wheel drive position to the forward high-speed two-wheel drive position while a torsion is produced between the driving shafts 1, 2; only the outer peripheral side member 20 first moves toward the front side against the spring 29 to bring the drive mode into the high-speed four-wheel drive. At the moment when a load of the vehicle at the side of the second driving shaft 2 momentarily becomes zero after the vehicle starts to move under the above condition, the inner peripheral side member 21 moves forward due to the elastic force (restoring force) of the spring 29 to automatically change the drive mode into the two-wheel drive.

Figure 4:
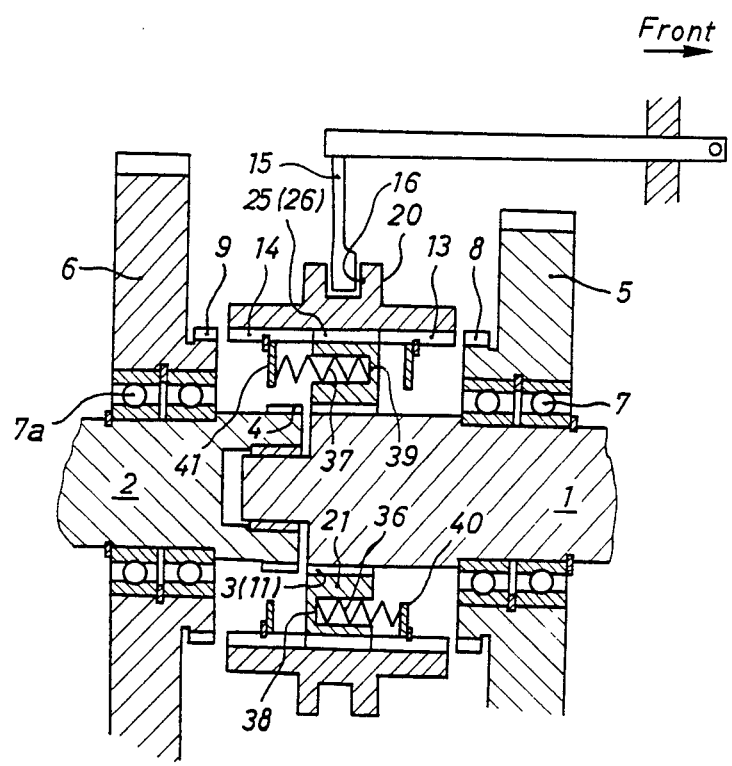
FIG. 4 is a vertical sectional view according to a second embodiment of this invention.

FIG. 4 shows a second embodiment, in which a component corresponding to that of FIG. 2 is attached with the same member as FIG. 2. In this embodiment of FIG. 4, splines 8, 9 of both gears 5, 6 are formed outwardly and splines 13, 14 of an outer peripheral side member 20 are formed inwardly. A spline 25 of the outer peripheral side member 20, which meshes with a spline 26 of an inner peripheral side member 21, is formed integrally with the splines 13, 14 to make manufacturing of the outer peripheral side member 20 easy.

Further, a first spring 36, which urges the inner peripheral side member 21 rearward relatively to the outer peripheral side member 20, and a second spring 37, which urges it forward relatively thereto, are provided as a damper means. Namely, a first spring receiving recession 38 having a forwardly opening shape and a second spring receiving recession 39 having a rearwardly opening shape are formed in the inner peripheral side member 21. While, annular first and second holding plates 40, 41 fit in both front and rear inner peripheral portions of the outer peripheral side member 20, the first holding plate 40 is stopped by means of a snap ring so as not to move in the forward direction, and the second holding plate 41 is stopped by means of a snap ring so as not to move in the rearward direction. The first and second springs 36, 37 are inserted into the first and second spring receiving recessions 38, 39 respectively, being compressed by means of the first and second holding plates 40, 41 respectively.

Function of the embodiment shown in FIG. 4 is the same as that of the embodiment shown in FIG. 2. Provided that the first spring 36 is compressed in case when the outer peripheral side member 20 moves rearward relatively to the inner peripheral side member 21, and the second spring 37 is compressed in case when it moves forward relatively thereto.

Incidentally, the first driving shaft 1 can be used for driving the rear wheel and the second driving shaft 2 can be used for driving the front wheel, in this invention. Namely, the vehicle can be driven by the two-wheel drive mode through the rear wheel. Further, in a vehicle for industrial machinery having a driving unit with caterpillar, the first driving shaft 1 can be used for driving a right wheel, for example, and the second driving shaft 2 can be used for driving a left wheel.

As mentioned above, in this invention, the power change-over annular spool 10 is divided into two members: the outer peripheral side member 20 having splines 13, 14 meshing freely with the splines 8, 9 of the high-speed gear 5 and the low-speed gear 6 and the inner peripheral side member 21 having the spline 11 meshing freely with the splines 3, 4 of the first and second driving shafts 1, 2; and said both members 20, 21 are connected each other so as to integrally rotate in the rotational direction and to relatively slide through the damper means (spring 29 etc.) in the axial direction so that, even when the vehicle is stopping under the condition that the splines 3, 4 of the driving shafts 1, 2 for the front and rear wheels do not mesh each other through the spool 10 due to a phase difference produced therebetween or under a loaded condition, the change-over between the high-speed and the low-speed is securely performed by operating the spool 10 only once during stopping of the vehicle and the change-over between the two-wheel drive and the four-wheel drive is automatically performed by means of the restoring force of the damper means when the vehicle starts to move. Namely, the change-over operation through the spool 10 can be performed simply and securely.

Further, both the change-overs between the high-speed and low-speed and between the two-wheel drive and four-wheel drive become possible by only, for example, connecting one shift fork 15 to the spool 10 composed as one piece, so that minimizing size and saving cost of the mechanism can be accomplished.

Incidentally, a rubber-like elastic body or an air spring etc. may be used as the damper unit of this invention.

What is claimed is:

1. A power change-over mechanism of a vehicle for industrial machinery including a first driving shaft and a second driving shaft arranged on the same axis center, a high-speed gear and a low-speed gear fitted in said first and second driving shafts respectively, splines formed on said both shafts and both gears, a power change-over annular spool disposed between the both gears freely slidingly operably in the axial direction, splines formed on said spool, the slow-speed gear being interconnected through the spool to the first and second driving shafts when the spool is at a four-wheel drive position, and the high-speed gear being interconnected through the spool to the first driving shaft when the spool is at a two-wheel drive position; characterized by that the spool is divided into two members: an outer peripheral side member having splines meshing freely with the splines of said gears and an inner peripheral side member having a spline meshing freely with the splines of said driving shafts, and the both members are connected each other so as to integrally rotate in the rotational direction and to relatively slide through a damper means in the axial direction.

2. A power change-over mechanism of a vehicle for industrial machinery as set forth in claim 1, in which the outer peripheral side member is spline fitted onto the inner peripheral side member.

3. A power change-over mechanism of a vehicle for industrial machinery as set forth in claim 2, in which notchs are formed on an inner peripheral surface of the outer peripheral side member and an outer peripheral surface of the inner peripheral side member respectively, a coil spring functioning as a damper means is disposed between a cylindrical space formed by the notchs freely expansively and contractibly in the axial direction, and both ends of the spring are secured to the outer peripheral side member and the inner peripheral side member so that the spring can be compressed when the inner peripheral side member moves retatively to the outer peripheral side member in either direction: front or rear.

4. A power change-over mechanism of a vehicle for industrial machinery as set forth in claim 3, in which holding plates are provided at both ends of the notchs of the outer peripheral side member, holding plates are provided at both ends of the notchs of the inner peripheral side member, and the coil spring is compressively installed between the holding plates.

5. A power change-over mechanism of a vehicle for industrial machinery as set forth in any one of claim 2, 3 or 4, in which splines for both the high-speed and low-speed gears are formed inwardly, and the splines meshing with said splines are formed on an outer peripheral surface of an outer peripheral side menber.

6. A power change-over mechanism of a vehicle for industrial machinery as set forth in claim 2, in which splines for both the high-speed and low-speed gears are formed outwardly, and the splines meshing with said splines are formed on an inner peripheral surface of the outer peripheral side member.

7. A power change-over mechanism of a vehicle for industrial mechanism as set forth in claim 6, in which a first spring urging the inner peripheral side member rearward relatively to the outer peripheral side member and a second spring urging the inner member forward relatively to the outer member are provided as the damper means.

8. A power change-over mechanism of a vehicle for industrial machinery as set forth in claim 7, in which a first spring receiving recession having a forwardly opening shape and a second spring receiving recession having a rearwardly opening shape are formed in the inner peripheral side member, and a first holding plate compressing the first spring and a second holding plate compressing the second spring are provided on the inner peripheral surface of the outer peripheral side member.

* * * * *